US009481277B1

(12) United States Patent
Ruelas (10) Patent No.: US 9,481,277 B1
(45) Date of Patent: Nov. 1, 2016

(54) ADJUSTABLE HEADREST (71) Applicant: Ford Global Technologies, LLC, Dearborn, MI (US)

(72) Inventor: Eduardo Arturo Aguilar Ruelas, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/862,256

(22) Filed: Sep. 23, 2015

(51) Int. Cl.
*B60N 2/48* (2006.01)

(52) U.S. Cl.
CPC ............ *B60N 2/4882* (2013.01); *B60N 2/4852* (2013.01)

(58) Field of Classification Search
CPC ............................ B60N 2/4852; B60N 2/4882
USPC ........................................ 297/397, 398, 406
See application file for complete search history.

(56) References Cited

U.S. PATENT DOCUMENTS

| 5,531,505 | A | | 7/1996 | Baetz et al. |
|---|---|---|---|---|
| 5,752,742 | A | | 5/1998 | Kerner et al. |
| 5,967,613 | A | * | 10/1999 | McKeever ................ A61G 5/12 297/406 X |
| 5,997,091 | A | * | 12/1999 | Rech .................... B60N 2/4838 297/398 X |
| 6,120,099 | A | * | 9/2000 | Reikeras .............. B60N 2/4808 297/406 X |
| 6,220,668 | B1 | | 4/2001 | Scheffzuck |
| 6,305,749 | B1 | | 10/2001 | O'Connor et al. |
| 6,474,733 | B1 | | 11/2002 | Heilig et al. |
| 6,513,871 | B2 | * | 2/2003 | Bartels ................. B60N 2/4808 297/406 X |
| 6,648,416 | B2 | | 11/2003 | O'Connor et al. |
| 7,080,886 | B2 | * | 7/2006 | Bauer ....................... A47C 7/38 297/406 X |
| 7,213,884 | B2 | * | 5/2007 | Flory ................... B60N 2/4882 297/397 X |
| 7,264,313 | B2 | * | 9/2007 | Clough .................... A47C 7/38 297/406 |
| 7,500,721 | B2 | * | 3/2009 | Beroth ................... B60N 2/482 297/406 |
| 8,911,020 | B2 | * | 12/2014 | Westerink ............. B64D 11/06 297/406 |
| 8,950,813 | B2 | * | 2/2015 | Nawaz ................. B60N 2/4844 297/398 X |
| 9,216,676 | B1 | * | 12/2015 | Reyes Luna ........... B60N 2/449 |
| 2001/0040401 | A1 | * | 11/2001 | Lin ........................ A47C 7/383 297/397 |
| 2004/0007910 | A1 | * | 1/2004 | Skelly ...................... A47C 7/38 297/406 |
| 2005/0161993 | A1 | * | 7/2005 | Flory ................... B60N 2/4882 297/406 |

(Continued)

FOREIGN PATENT DOCUMENTS

| DE | 102014209889 | | 5/2015 |
|---|---|---|---|
| GB | 2302268 | | 1/1997 |
| JP | 60148726 | A * | 8/1985 |

*Primary Examiner* — Rodney B White
(74) *Attorney, Agent, or Firm* — Vichit Chea; Price Heneveld LLP (57) ABSTRACT

A headrest assembly includes a centrally disposed headrest bun having an upper portion and an adjustable lower portion. The adjustable lower portion is configured to move between extended and retracted positions relative to the upper portion. First and second side supports are operably coupled to the headrest bun on opposite sides of the headrest bun. The first and second side supports are operable between upright and deployed positions relative to the headrest bun. The adjustable components of the headrest assembly make for a headrest assembly that is operable between neutral and surround configurations.

17 Claims, 11 Drawing Sheets

(56) References Cited

U.S. PATENT DOCUMENTS

| | | | |
|---|---|---|---|
| 2006/0033374 A1* | 2/2006 | Pos | B60N 2/2851 297/397 |
| 2012/0139309 A1* | 6/2012 | Gaither | B60N 2/4879 297/391 X |
| 2012/0161489 A1* | 6/2012 | Nam | A47C 7/38 297/406 |
| 2012/0299356 A1* | 11/2012 | Edwards | B60N 2/4879 297/397 |
| 2015/0197170 A1* | 7/2015 | Obukhov | B60N 2/4882 297/391 |
| 2015/0203008 A1* | 7/2015 | Wang | B60N 2/4864 297/406 |
| 2015/0329025 A1* | 11/2015 | Szczygiel | B60N 2/4882 297/391 |

* cited by examiner

ADJUSTABLE HEADREST

FIELD OF THE INVENTION

The present invention generally relates to a headrest assembly for a vehicle seat, and more particularly, to a headrest assembly that is adjustable to provide a surround configuration for providing enhanced comfort and support to a vehicle occupant.

BACKGROUND OF THE INVENTION

Headrests are often disposed on a seatback of a vehicle seat and can be uncomfortable, particularly when the headrest is not adjustable to suit the needs of a particular vehicle occupant. For tired passengers, long trips can leave a vehicle occupant with aches and pains associated with sleeping with their head disposed at an awkward angle. Thus, a headrest assembly is desired that provides full lateral support for the upper body by providing a surround configuration akin to a travel pillow when deployed.

SUMMARY OF THE INVENTION

One aspect of the present invention includes a vehicle seat having a seatback that is coupled to a seat cushion. A headrest assembly is supported from the seatback and operable between neutral and surround configurations. The headrest assembly includes a headrest bun having a lower portion that is configured to move between extended and retracted positions. One or more side supports are adjustably coupled to the headrest bun and operable between upright and deployed positions with respect to the headrest bun.

Another aspect of the present invention includes a headrest assembly having a headrest bun with upper and lower portions. The lower portion of the headrest bun is operable between extended and retracted positions relative to the upper portion of the headrest bun. First and second side supports are pivotally coupled to the headrest bun and are operable between upright and deployed positions. The headrest assembly provides a surround configuration when the lower portion of the headrest bun is in the extended position and the first and second side supports are deployed.

Yet another aspect of the present invention includes a headrest assembly having a centrally disposed headrest bun which includes an upper portion and an adjustable lower portion. The adjustable lower portion is configured to move between extended and retracted positions relative to the upper portion. First and second side supports are operably coupled to the headrest bun on opposite sides of the headrest bun. The first and second side supports are operable between upright and deployed positions relative to the headrest bun. The adjustable components of the headrest assembly make for a headrest assembly that is operable between neutral and surround configurations.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
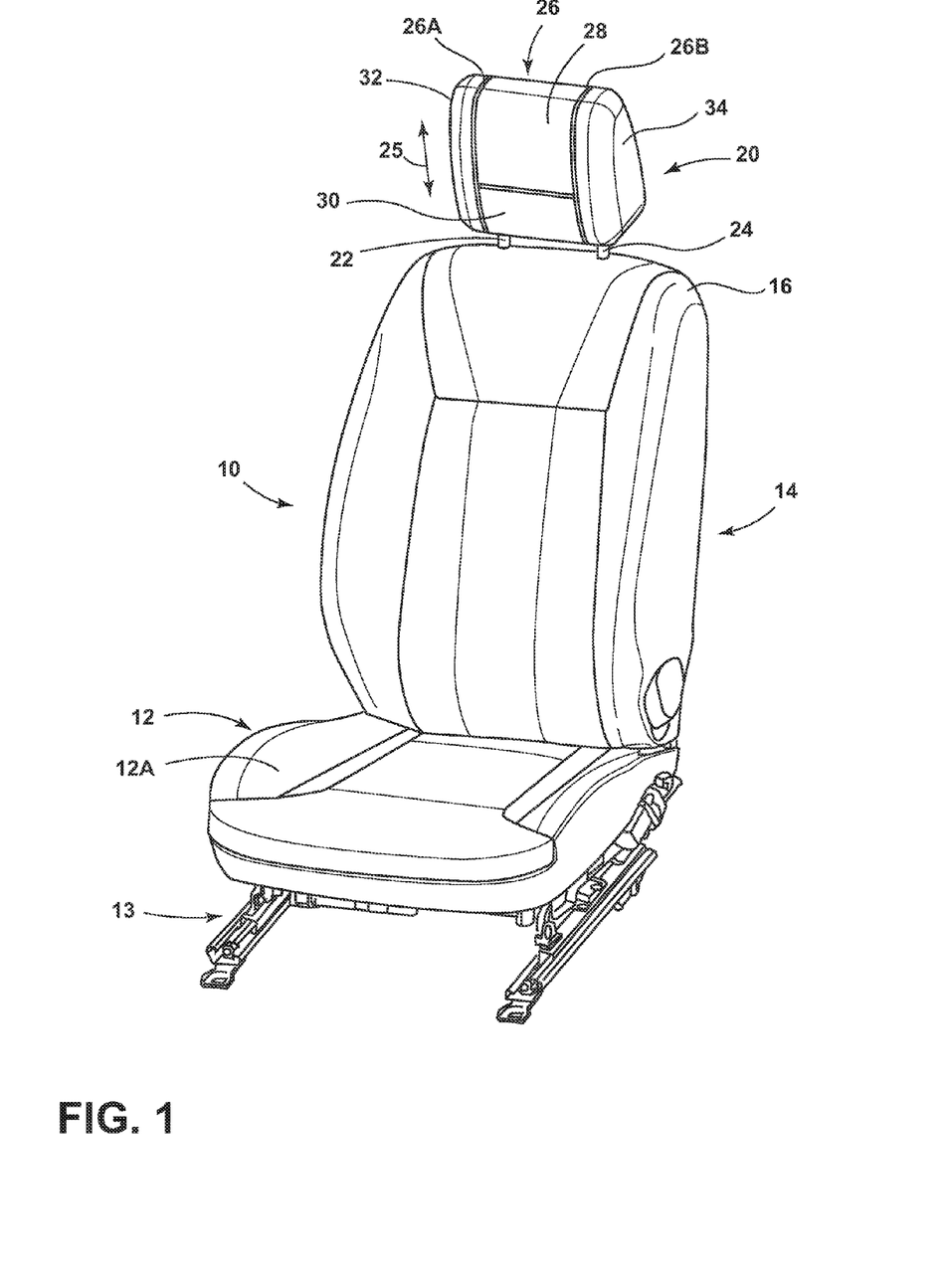
FIG. 1 is a front perspective view of a vehicle seat having a headrest according to one embodiment of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, the reference numeral 10 generally designates a vehicle seat assembly as illustrated in accordance with an embodiment of the present invention.

The vehicle seat 10 may be a driver seat, or any other passenger seat, such as a first row seat, a second row seat or any subsequent row seat. The vehicle seat 10 includes a seat portion 12 with a cushion member 12A for supporting a vehicle occupant thereupon. A track assembly 13 is coupled to the seat portion 12 and contemplated to be secured to a floor surface of a vehicle for moving the vehicle seat 10 between fore and aft positions. The vehicle seat 10 also includes a seatback 14 extending upwardly from a rear portion of the seat portion 12 for supporting a torso of the vehicle occupant. The seatback 14 includes an upper portion 16 having a headrest assembly 20 adjustably mounted thereto. The headrest assembly 20 is supported by first and second support struts 22, 24 slideably received in the seatback 14 at the upper portion 16 thereof. The first and second support struts 22, 24 are configured to adjustably move the headrest assembly 20 in a substantially vertical direction as indicated by arrow 25. In use, the headrest assembly 20 is configured to support a head of a vehicle occupant when the vehicle occupant is seated in the vehicle seat 10 and rests his or her head against the headrest assembly 20. Although an individual vehicle seat 10 is illustrated in the embodiment of FIG. 1, it is contemplated that any size vehicle seat 10 may be utilized, such as a bench seat, which may include one or more headrest assemblies.

As further shown in FIG. 1, the headrest assembly 20 includes a centrally disposed headrest bun 26 having an upper portion 28 disposed above a lower portion 30. Disposed on opposed sides 26A, 26B of the headrest bun 26, first and second side supports 32, 34 are adjustably coupled to the headrest bun 26 and are operable between upright and deployed positions in a pivoting manner, as further described below. The headrest assembly 20 is contemplated to be a multi-configurational headrest assembly which is shown in FIG. 1 in a ground state or neutral configuration, thereby defining a first configuration for the headrest assembly 20. Conversion of the headrest assembly 20 to a surround configuration, which emulates a travel pillow style comfort and support configuration, will now be described with reference to FIGS. 2A-2D.

Figure 2A:
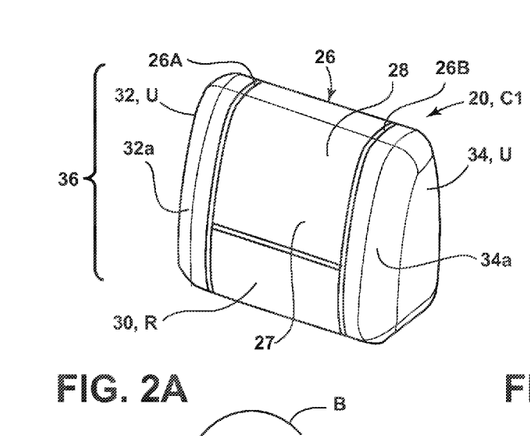
FIGS. 2A-2D are front perspective views of the headrest assembly of FIG. 1, showing conversion of the headrest assembly from a first configuration to a second configuration.
Figure 2B:
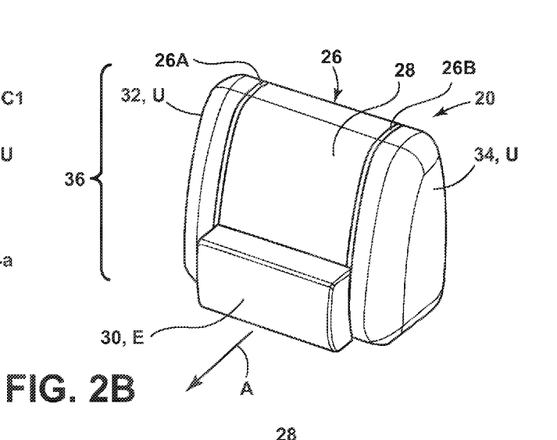

Referring now to FIGS. 2A and 2B, the headrest assembly 20 is shown in the neutral configuration C1 (FIG. 2A) with the lower portion 30 of the headrest bun 26 shown in a retracted position R and the first and second side supports 32, 34 disposed in upright positions U. As shown in the neutral configuration C1, the headrest assembly 20 provides for a generally uniform front facing contour 36 comprised of the upper and lower portions 28, 30 of the headrest bun 26, along with the first and second side supports 32, 34 residing in a substantially common plane. Outer surfaces 27 of the upper and lower portions 28, 30 of the headrest bun 26, along with outer surfaces 32a, 34a of the first and second side supports 32, 34 are forward facing, as shown in FIG. 2A, when the headrest assembly 20 is in the neutral configuration C1. As shown in FIG. 2B, the lower portion 30 of the headrest bun 26 is shown in a forward extended position E, relative to the neutral configuration C1 shown in FIG. 2A. In the extended position E, the lower portion 30 of the headrest bun 26 has moved in a car-forward direction as indicated by arrow A to displace the lower portion 30 of the headrest bun 26 relative to the upper portion 28. As moved to the extended position E, the lower portion 30 of the headrest bun 26 is configured to provide support for a neck of a vehicle occupant, while the upper portion 28 of the headrest bun 26 provides support for the back of a vehicle occupant's head. This is due to the stepped or shoulder relationship of the upper and lower portions 28, 30 of the headrest bun 26 shown in FIG. 2B, with the lower portion 30 in the extended position E. It is contemplated that the upper portion 28 of the headrest bun 26 is a stationary member that does not move as disposed over the adjustable lower portion 30.

Figure 2C:
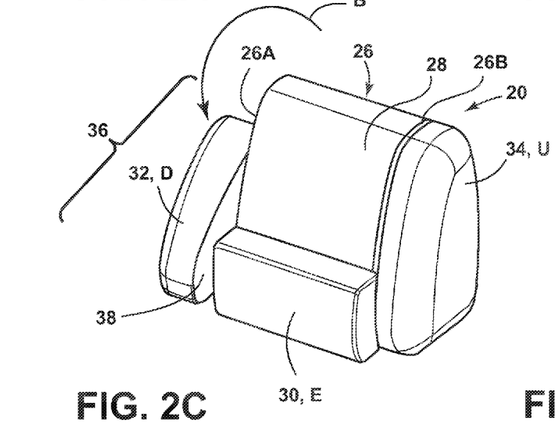

Referring now to FIG. 2C, the first side support 32 is shown in a deployed position D having pivoted relative to the headrest bun 26 along a rotational path as indicated by arrow B. In the position shown in FIG. 2C, the first side support 32 provides an inner support surface 38 for supporting a side of a vehicle occupant's head and neck similar to an outwardly extending leg of a travel pillow. When the first side support 32 is in the upright position U (FIG. 2A), the inner support surface 38, which is an innermost surface of the side support 32, is exposed and generally disposed adjacent to the first side 26A of the headrest bun 26. Similarly, second side support 34 is in the deployed position D (FIG. 2D), an inner support surface thereof is also provided to support the passenger's head as received therebetween.

Figure 2D:
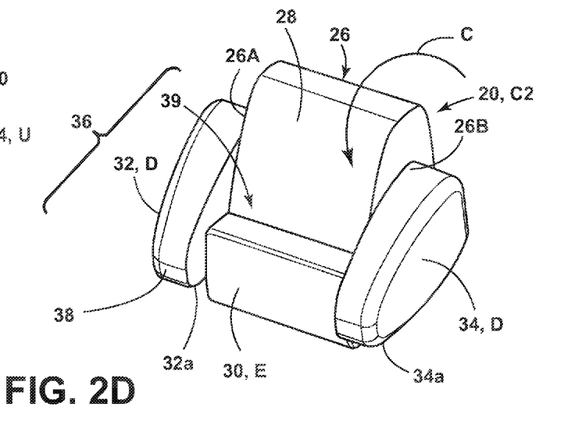

Referring now to FIG. 2D, the second side support 34 is shown in a deployed position D as having rotated from the upright position U to the deployed position D along a rotational path as indicated by arrow C. When the first and second side supports 32, 34 are in the deployed positions D, the first and second side supports 32, 34 generally extend outward from the central headrest bun 26 in a forward direction, and the outer surfaces 32a, 34a of the first and second side supports 32, 34 are generally downward facing as shown in FIG. 2D. With the first and second side supports 32, 34 in the deployed positions D, a head receiving area 39 is defined for receiving the head of a vehicle occupant. With the first and second side supports 32, 34 in the deployed positions D, and the lower portion 30 of the headrest bun 26 in the extended position E, the headrest assembly 20 provides a second configuration C2, referred to herein as a first surround configuration, which provides comfort and support to a vehicle occupant similar to that of a U-shaped travel pillow accessory. Further, it is contemplated that the first and second side supports 32, 34 can be in the deployed positions D (FIG. 2D), while the lower portion 30 of the headrest bun 26 is in the retracted position R to define a second configuration C2, referred to herein as a second surround configuration, which also provides comfort and support to a vehicle occupant in a manner similar to that of a U-shaped travel pillow accessory, without the added support of the lower portion 30 of the headrest bun 26. When the lower portion 30 of the headrest bun 26 moves from the retracted position R (FIG. 2A) to the extended position E (FIG. 2B), the lower portion 30 of the headrest bun 26 moves into the head receiving area 39.

It is contemplated that deployment of the separate components of the headrest assembly 20, when moving from the neutral configuration C1 to the surround configuration C2, may be initiated by a user engaging a user interface to select a desired configuration for the headrest assembly 20. The individual components of the headrest assembly 20 that are adjustable (the first and second side supports 32, 34 and the lower portion 30 of the headrest bun 26) may move separately or in unison in converting the headrest assembly 20 from the neutral configuration C1 (FIG. 2A) to the surround configuration C2 (FIG. 2D). Systems configured to move the adjustable components of the headrest assembly 20 are further described below.

Figure 3:
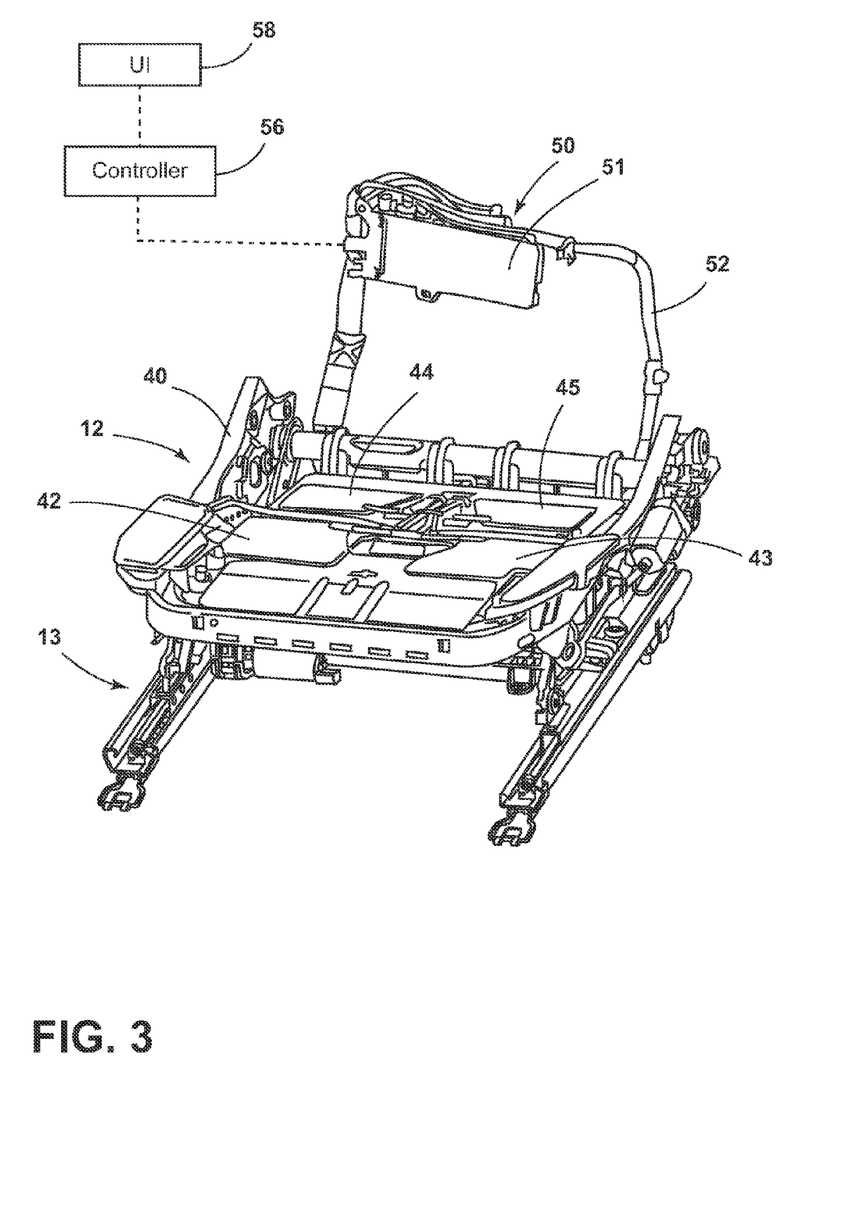
FIG. 3 is a top perspective view of a seat portion of the vehicle seat having cushions removed to reveal a frame and air inflation system.
Figure 4:
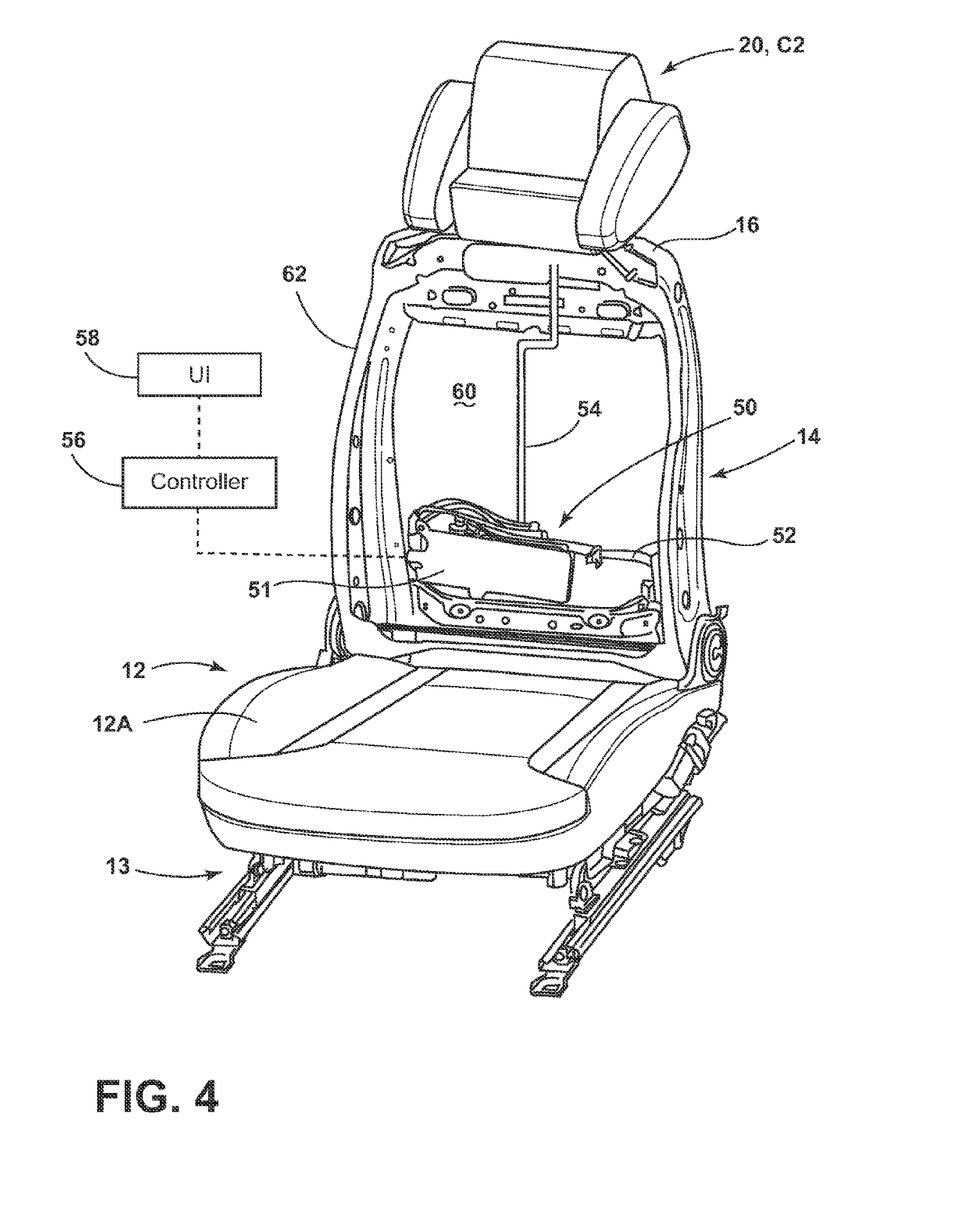
FIG. 4 is a top perspective view of the seat portion of FIG. 3 having a seatback disposed thereon with the headrest of FIG. 1 disposed in the second configuration and coupled to the air inflation system.

Referring now to FIG. 3, the seat portion 12 is shown having the cushion member 12A removed therefrom relative to FIG. 1. With the cushion member 12A removed, a seat frame 40 is revealed which may be a metal frame configured to support the cushion member 12A and vehicle occupant when the vehicle occupant is in a seated position on the seat portion 12 of the vehicle seat 10. The seat frame 40 is shown having a number of inflatable air bladders 42-45 generally supported thereon. In assembly, as shown in FIG. 1, the air bladders 42-45 are generally covered and concealed by the cushion member 12A. An air inflation system 50 is shown in FIG. 3 and includes a motor or pump 51 coupled to air passageways 52 for inflating the air bladders 42-45 to provide a customized seating arrangement for a vehicle occupant. With reference to FIG. 4, the air inflation system 50 is shown disposed in a space 60 defined by a seatback frame 62 and coupled to the seatback frame 62. The inflation system 50, as shown in FIG. 4, further includes air passageways 54 (FIG. 4) for powering one or more pneumatic mechanisms configured to move the components of the headrest assembly 20 between the neutral configuration C1 (FIGS. 1 and 2A) and the surround configuration C2 (FIGS. 2D and 4), as well as the configurations therebetween. It is contemplated that the pneumatic mechanisms are configured to power movement of the adjustable components of the headrest assembly 20, and that the adjustable components of the headrest assembly 20 may be selectively moveable by way of a controller 56 interfaced with a user interface 58, such as a switch, a button or a touch screen display, for adjusting a position of any one adjustable component. Further it is contemplated that the pneumatic mechanisms configured to power movement of the adjustable components of the headrest assembly 20 may be further be configured such that the components are moveable in a synchronized manner using the controller 56 and user interface 58, such that all the adjustable components of the headrest assembly (including the first and second side supports 32, 34 and the lower portion 30 of the headrest bun 26), as well as a height adjustment mechanism for the first and second support struts 22, 24 may be moved in a synchronized manner.

Figures 5A, 5B:
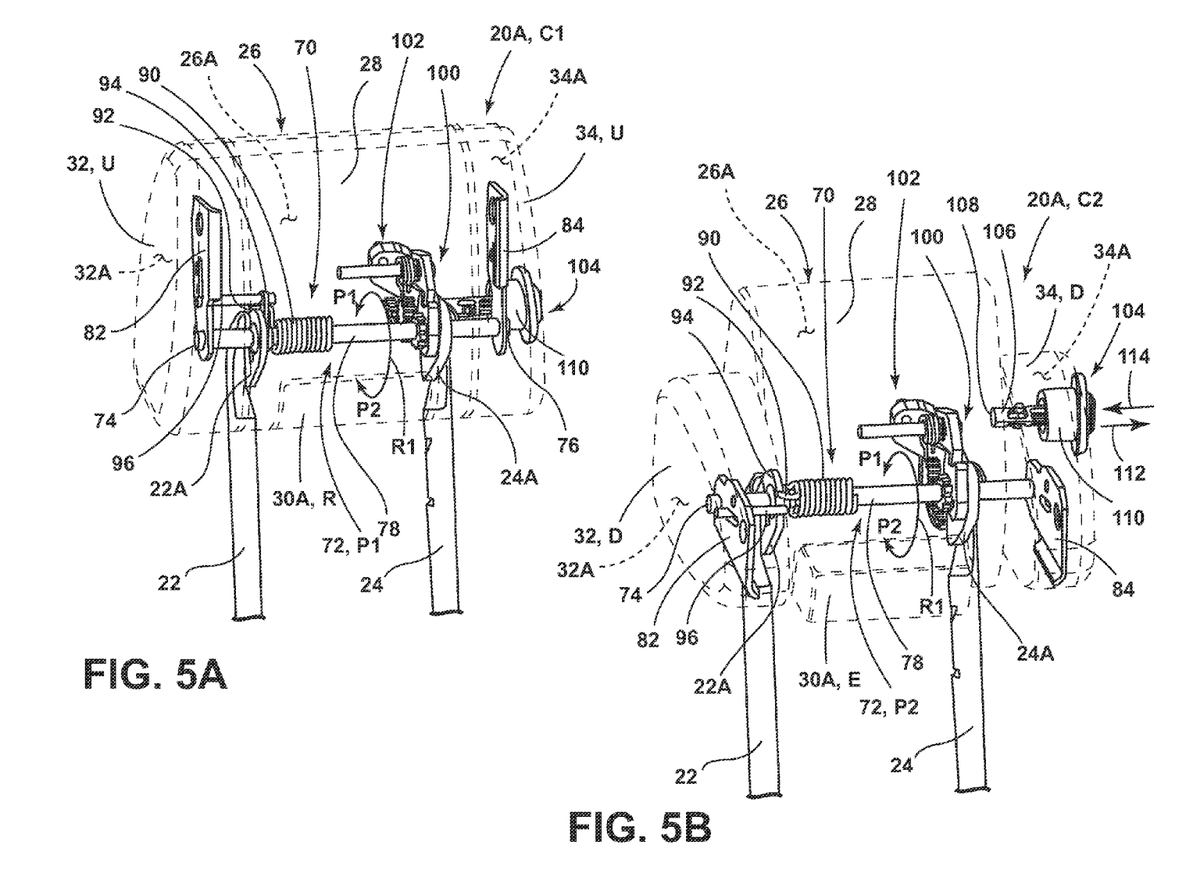
FIG. 5A is a perspective view of another embodiment of a headrest assembly with components of the headrest assembly shown in phantom to reveal a drive system in a first configuration.
FIG. 5B is a perspective view of the headrest assembly of FIG. 5A with the drive system in a second configuration.

Referring now to FIGS. 5A and 5B, a headrest assembly 20A, according to another embodiment, is shown. The headrest assembly 20A includes a number of features similar to headrest assembly 20 described above, such that like reference numerals will be used to describe similar parts of headrest assembly 20A as found in the description of headrest assembly 20. In FIGS. 5A and 5B, the headrest bun 26 and the first and second side supports 32, 34 are shown in phantom to reveal a drive system 70. With specific reference to FIG. 5A, the headrest assembly 20A is shown in the neutral configuration C1. With specific reference to FIG. 5B, the headrest assembly 20A is shown in the surround configuration C2. The drive system 70 is shown having a generally horizontally disposed shaft 72 having first and second ends 74, 76. The shaft is rotatably coupled to mounting plates 22A, 24A, which are coupled to the first and second support struts 22, 24. In this way, a central portion 78 of the shaft 72 is disposed within an interior 26A of headrest bun 26 and interconnects the first and second support struts 22, 24 via plates 22A, 24A, to which the shaft 72 is rotatably received in a direction as indicated by arrow R1 between first and second positions P1, P2. The first and second ends 74, 76 of the shaft 72 extend outwardly from the headrest bun 26 into interior portions 32A, 34A of the first and second side supports 32, 34. The first and second ends 74, 76 are respectively coupled to first and second support arms 82, 84 which are fixedly coupled to the shaft 72 at lower portions thereof, for rotation with the shaft 72 in the direction as indicated by arrow R1. In the embodiment shown in FIGS. 5A and 5B, the drive system 70 is contemplated to move the first and second side supports 32, 34 from the upright position U to the deployed position D in a synchronized manner as the shaft 72 rotates from the first position P1 to the second position P2. Further, the lower portion 30A of the headrest bun 26 is contemplated to move in a synchronized manner from the retracted position R to the extended position E as the first and second side supports 32, 34 move from the upright position U to the deployed position D. The synchronized movement of the first and second side supports 32, 34 and the lower portion 30A of the headrest bun 26 is provided by a gear assembly as further described below.

With specific reference to FIG. 5B, the drive system 70 is shown having a biasing mechanism 90 in the form of a torsion spring that is operably coupled to the central portion 78 of the shaft 72. The biasing mechanism 90 includes an engagement end 92 which engages a drive cam 94 which is further coupled to the first support arm 82 via a connecting shaft 96. In assembly, the biasing mechanism 90 is configured to bias the shaft 72 from the first position P1 to the second position P2 along the path as indicated by arrow R1. A locking mechanism 100 is configured to lock and retain the shaft 72 in the first position P1, wherein the first and second side supports 32, 34 are in the upright position U and the lower portion 30A of the headrest bun 26 is in the retracted position R. The locking mechanism 100 is released using a release mechanism 102. Once the locking mechanism 100 is released by the release mechanism 102, the shaft 72 will rotate from the first position P1 to the second position P2 along the path as indicated by arrow R1 as biased by biasing mechanism 90. Thus, in FIG. 5A, the shaft 72 is shown in position P1 as retained by locking mechanism 100. In FIG. 5B, the shaft 72 has rotated to the second position P2 as biased by the biasing mechanism 90. In the second position P2, the first and second side supports 32, 34 are in the deployed position D, and the lower portion 30A of the headrest bun 26 is in the extended position E.

From the deployed position D, the first and second side supports 32, 34 can be manually rotated upwards to the upright position U by a user, wherein the lock mechanism 100 will automatically lock the first and second side supports 32, 34 in the upright position U. The release mechanism 102 is released using a release button 104 which is disposed on the second side support 34 in the embodiment shown in FIGS. 5A and 5B. When the first and second side supports 32, 34 are in the upright position U, the release button 104 is properly aligned with the release mechanism 102 for releasing the lock mechanism 100 of the drive system 70. As shown in FIG. 5B, when the first and second side supports 32, 34 are in the deployed position D, the release button 104 is rotated out of alignment with the release mechanism 102, and therefore cannot engage the same. The release button 104 is contemplated to be a spring biased button coupled to an engagement shaft 106 having a distal end 108. A housing 110 of the release button 104 is contemplated to include a biasing mechanism for biasing the release button 104 outward in a direction as indicated by arrow 112. When the release button 10 is pushed inward, in a direction as indicated by arrow 114, the engagement shaft 106 is contemplated to contact the release mechanism 102 as further described below with reference to FIGS. 7A-7C.

Figure 6A:
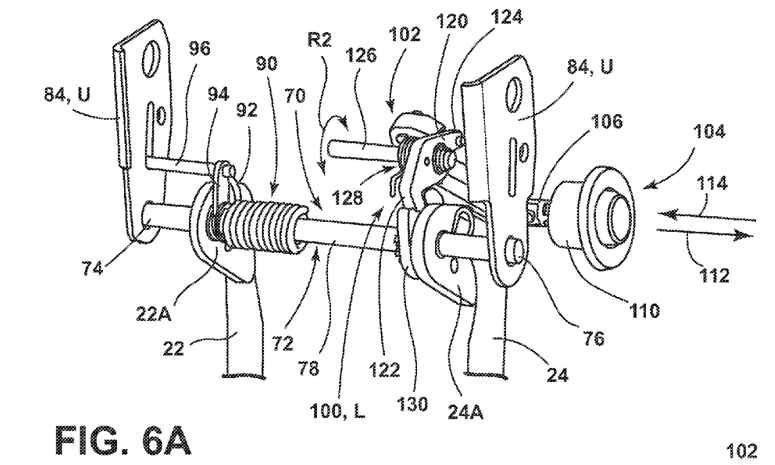
FIG. 6A is a perspective view of the drive system of FIG. 5A having a lock mechanism and a release mechanism.
Figure 6B:
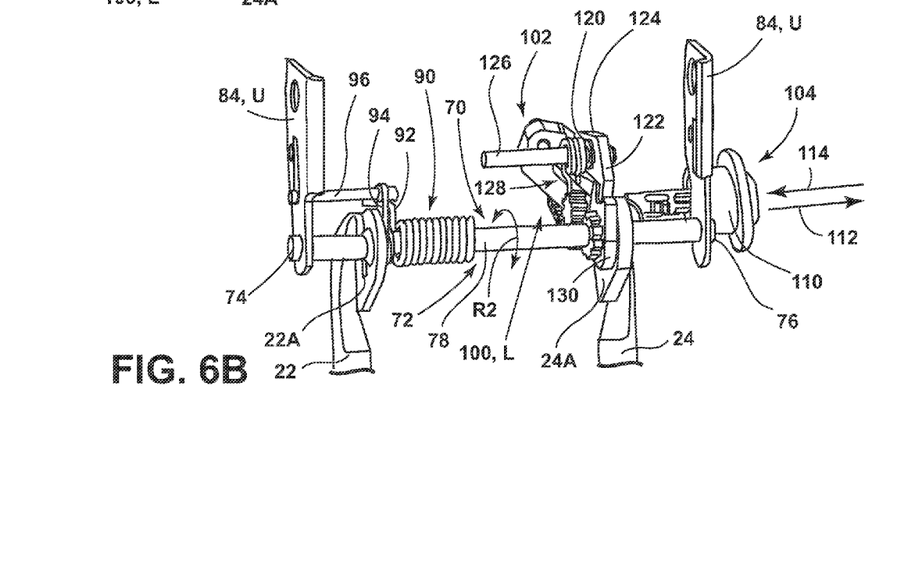
FIG. 6B is a perspective view of the drive system of FIG. 6A.

Referring now to FIGS. 6A and 6B, the drive system 70 is shown having the locking mechanism 100 in the locked position L. The locking mechanism 100 includes a pawl 120 having first and second ends 122, 124. The pawl 120 is rotatably coupled to a shaft 126 for rotation along the path as indicated by arrow R2. A biasing mechanism 128, in the form of a torsion spring, is coupled to the pawl 120 to bias the pawl 120 towards a forward rotation along the path as indicated by arrow R2 as shown in FIG. 6A. A catch 130 is coupled to the shaft 72 and includes a first notch 132 that is engaged by the first end 122 of the pawl 120 when the locking mechanism 100 is in the locked position L. In this way, the first end 122 of the pawl 120 retains the adjustable components of the headrest assembly in the neutral or first configuration C1 by the engagement of the second end 122 with the first notch 132 of the catch 130.

Figure 7A:
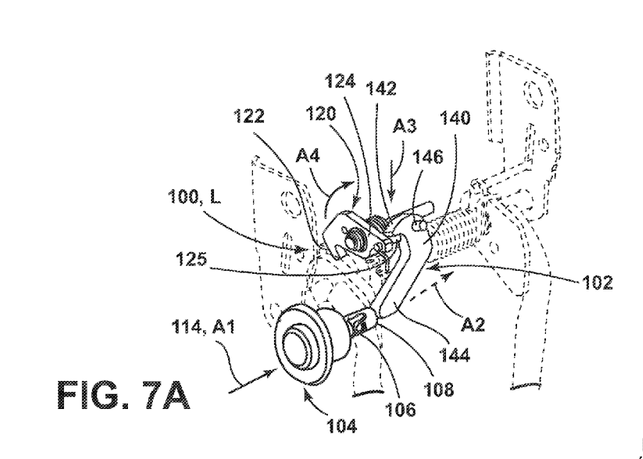
FIG. 7A is a rear perspective view of a drive system shown in phantom with the lock mechanism and release mechanism operably coupled thereto.
Figure 7B:
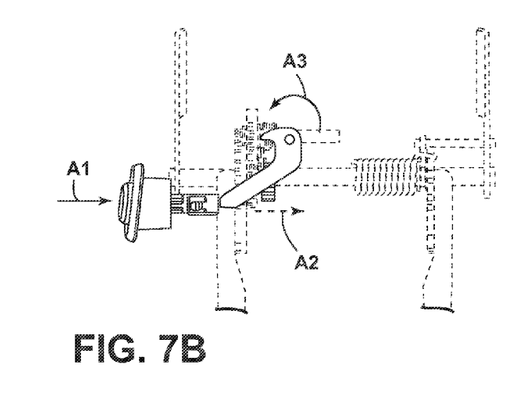
FIG. 7B is a rear elevational view of the release mechanism of FIG. 7A.
Figure 7C:
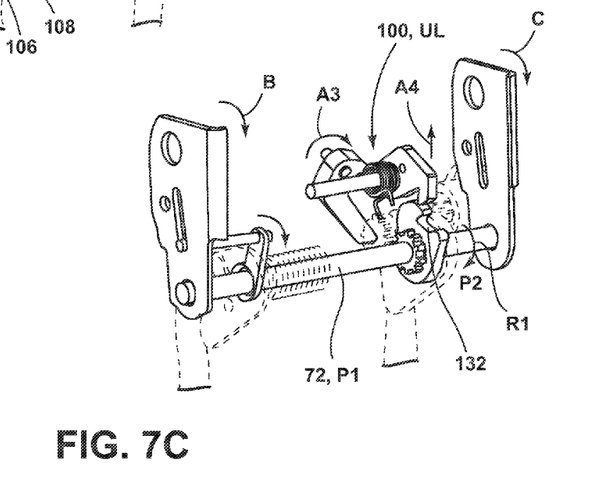
FIG. 7C is a front perspective view of the locking mechanism and release mechanism shown in a released position.

Referring now to FIG. 7A, the release mechanism 102 includes a lever 140 having a first end 142 and a second end 144. The first end 142 of the lever 140 is operably engaged with the second end 124 of the pawl 120 via a pin 125 that extends inwardly from the second end 124 of the pawl 120. The second end 144 of the lever 140 is operably engaged with the distal end 108 of the shaft 106 of the release button 104 when, as noted above, the first and second side supports 32, 34 are in the upright position U. An actuation path (A1-A4) is depicted in FIG. 7A for releasing the locking mechanism 100 to thereby allow the shaft 72 to rotate in a forward direction towards position P2 from position P1. The actuation path is indicated by arrow A1 which indicates an inward pressing of the release button 104, such that the distal end 108 of the shaft 106 acts on the second end 144 of the lever 140 to push the second end 144 of the lever 140 inward in a direction as indicated by arrow A2. The lever 140 is contemplated to pivot on a pivot pin 146 which may be coupled to a static component of the headrest bun 26 of the headrest assembly 20A. As the second end 144 of the lever 140 moves inward along the path as indicated by arrow A2, the first end 142 will move or rotate downward in a direction as indicated by arrow A3 to act on the pin 125 coupled to the pawl 120. This downward movement in the direction as indicated by arrow A3 of the first end 142 of the lever 140 causes the second end 124 of the pawl 120 to also move downward as the pawl 120 pivots on shaft 126 in a rearward direction as indicated by arrow A4. Movement of the pawl 120 in the direction as indicated by arrow A4 moves the first end 122 of the pawl 120 out of engagement with the first notch 132 of the catch 130, thereby releasing the shaft 72 as best shown in FIG. 7C. In FIG. 7C, the locking mechanism 100 is in the unlocked position UL, such that the shaft 72 can rotate from the first position P1 to the second position P2 along the path as indicated by arrow R1. As further shown in FIG. 7C, the first and second support arms 82, 84 will move in the direction as indicated by arrows B and C toward the deployed positions D for the first and second side supports 32, 34.

Figures 8A, 8B:
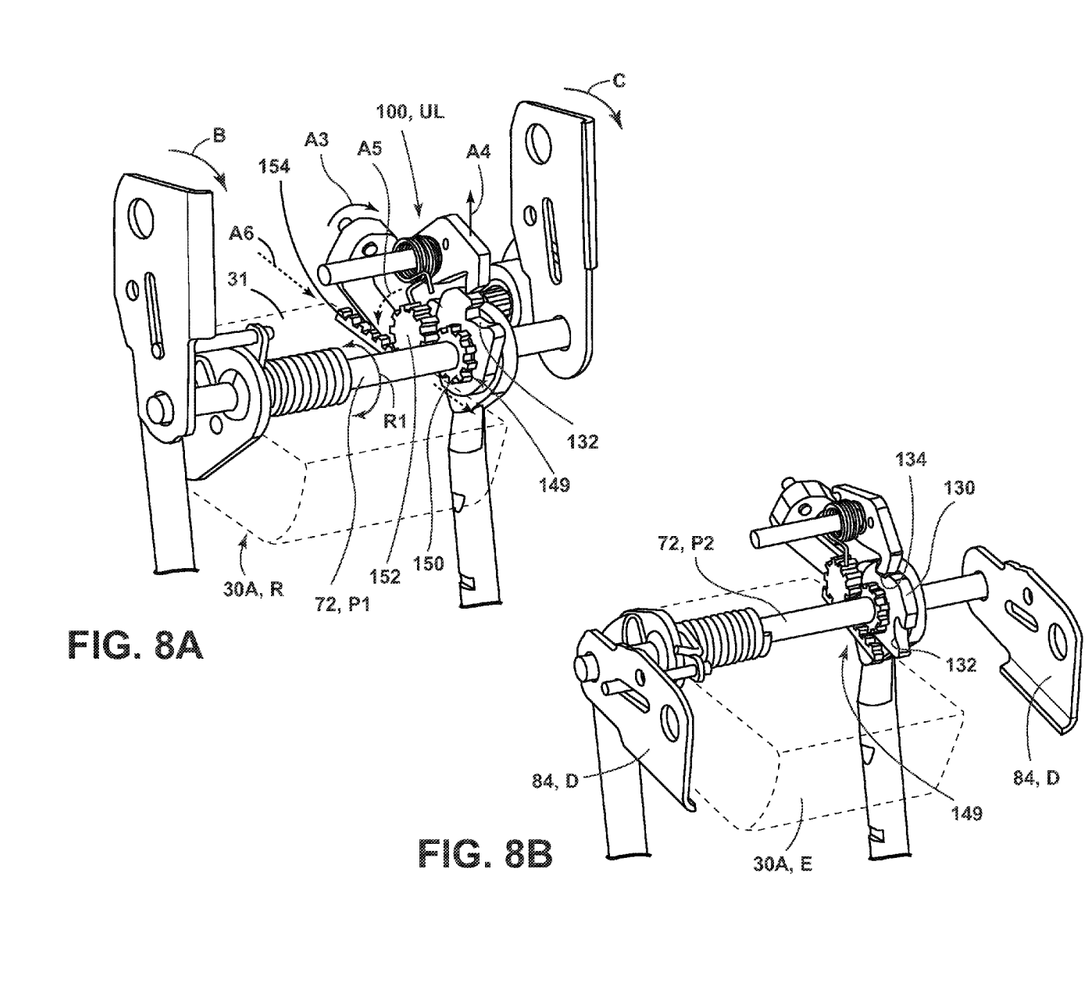
FIG. 8A is a front perspective view of the drive system shown in a release position as coupled to a lower portion of the headrest assembly.
FIG. 8B is a perspective view of the drive system of FIG. 8A shown in a deployed position.

Referring now to FIGS. 8A and 8B, the drive system 70 is shown with the locking mechanism 100 in the unlocked position UL, such that the shaft 72 can rotate from the first position P1 towards the second position P2 to deploy the adjustable components of the headrest assembly 20A. The headrest assembly 20A of the present concept further includes a gear assembly 149 comprising a first gear 150 disposed on the central portion 78 of the shaft 72 which is gearingly engaged with a second gear 152 which is rotatably coupled to the plate 24A. The first and second gears 150, 152 may be described as pinon gears having mating toothed sections for engagement with one another. Thus, as the shaft 72 rotates in a forward direction along the path as indicated by arrow R1 from position P1 to P2, so too will the first gear 150 rotate in a forward direction along the path as indicated by arrow R1. The rotation of the first gear 150 in the forward direction as indicated by arrow R1 will cause the second gear 152, to which the first gear 150 is engaged, to rotate in a reverse or rearward direction as indicated by arrow A5. The second gear 152 is further coupled to a rack 154 which is disposed on an upper surface 31 of the lower portion 30A of the headrest bun 26. The rack 154 includes a number of mating teeth for engagement with the second gear 152. Thus, as the second gear 152 rotates in a rearward direction as indicated by arrow A5, the lower portion 30A of the headrest bun 26 will move from the retracted position R (shown in FIG. 8A) to the extended position E (shown in FIG. 8B) as the rack 154 will be driven forward in a path as indicated by arrow A6 due to its engagement with the second gear 152. Thus, the gear assembly 149 ensures that the adjustable components of the headrest assembly 20A move in a synchronized manner from the neutral configuration C1 to the surround configuration C2. As the shaft 72 rotates from the first position P1 to the second position P2, the first and second arm supports 82, 84 rotate downward in the direction as indicated by arrows B and C, while the gear assembly 149 advances the lower portion 30A of the headrest bun 26 towards the extended position E to complete the surround configuration C2 in a synchronized manner. With specific reference to FIG. 8B, the first end 122 of the pawl 120 is shown disposed within a second notch 134 disposed on the catch 130. As noted above, the pawl 120 is biased by the torsion spring 128 towards a forward rotation, such that the pawl 120 will ride along the upper surface of the catch 130, until the first end 122 is engaged with the second notch 134 disposed on the catch 130. In this way, the pawl 120 acts as a stop mechanism for the rotation of the shaft 72 at position P2 by its engagement with the second notch 34 of the catch 130 that is operably coupled to the shaft 72.

Figure 9:
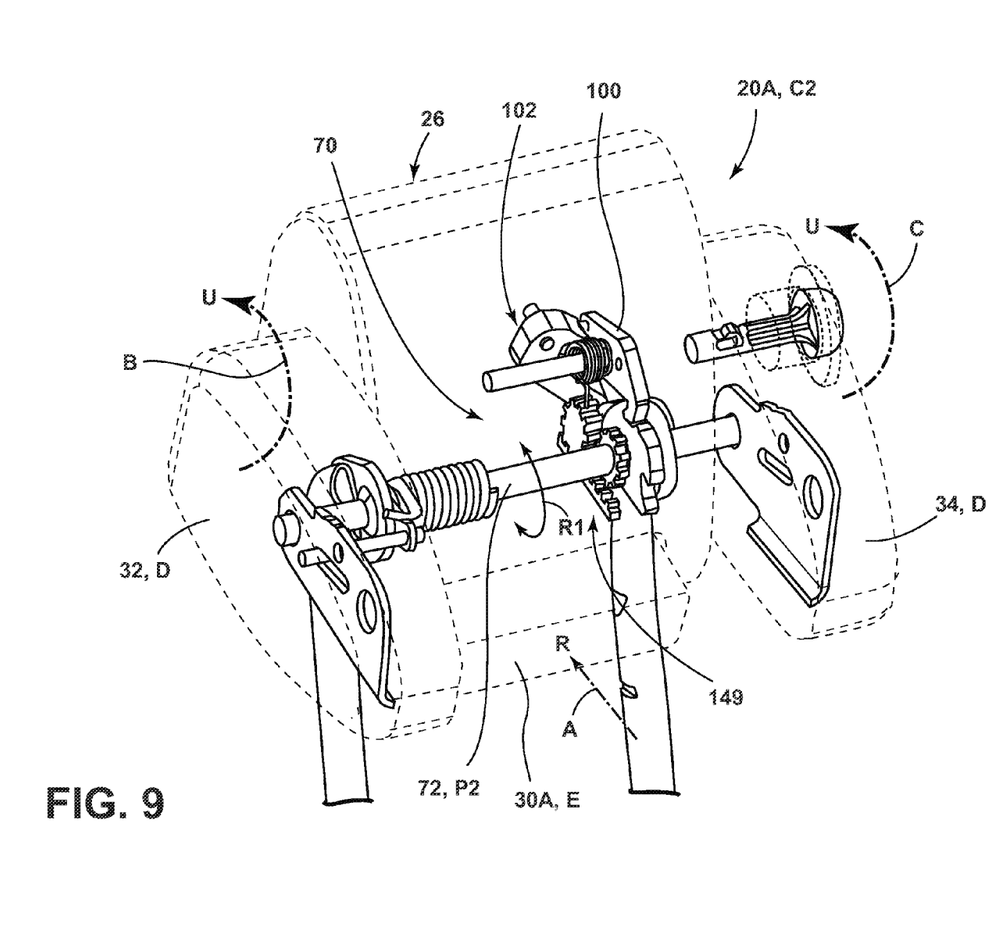
FIG. 9 is a perspective view of the headrest assembly of FIG. 5B showing relative movement of the side supports.

With the adjustable components of the headrest assembly 20A all interconnected to one another, movement of either of the first or second side supports 32, 34 from the deployed position D to the upright position U causes for all the adjustable components of the headrest assembly 20A to move towards the neutral configuration C1. With specific reference to FIG. 9, the first side support 32 is shown in the deployed position and is moveable to the upright position U along the path as indicated by arrow B. Similarly, the second side support 34 is shown in the deployed position D and is moveable to the upright position U along the path as shown by arrow C. Movement of either the first or second side support 32, 34 will cause the lower portion 30A of the headrest bun 26 to retract to the retracted position R along the path as indicated by arrow A. This is due to the coupling of the lower portion 30A of the headrest bun 26 with the shaft 72 through the gear assembly 149, as described above.

Figure 10:
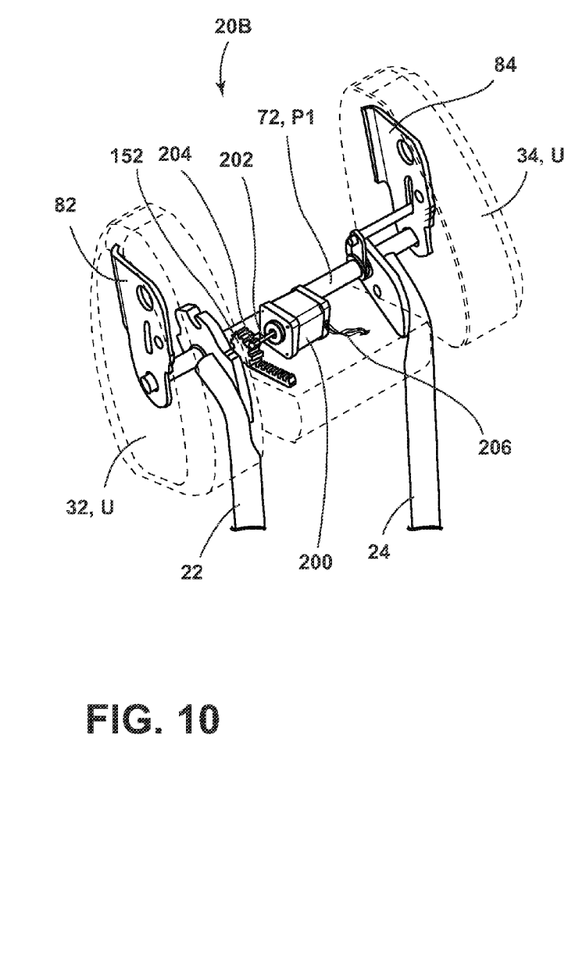
FIG. 10 is a rear perspective view of another embodiment of the drive system, wherein the drive system includes a motor.

Referring now to FIG. 10, a motor 200 is shown coupled to an embodiment of a headrest assembly 20B, wherein the motor includes a drive shaft 202 having a gear 204 disposed at an end thereof, wherein the gear 204 is coupled to the second gear 152 of the gear assembly 149 described above. It is further contemplated that the drive shaft 202 can be a toothed drive shaft that is directly engaged in a driven relationship with gear 152. The motor 200 further includes electrical leads 206 which are used to couple the motor 200 to the power system of a vehicle. It is contemplated that the motor 200 can control the movement of the adjustable components of the headrest assembly 20B using a user interface similar to user interface 58 shown in FIG. 4. The motor 200 can also be coupled to the pawl 120 for releasing the adjustable components from the locking mechanism 100, in a similar manner as described above.

Figure 11:
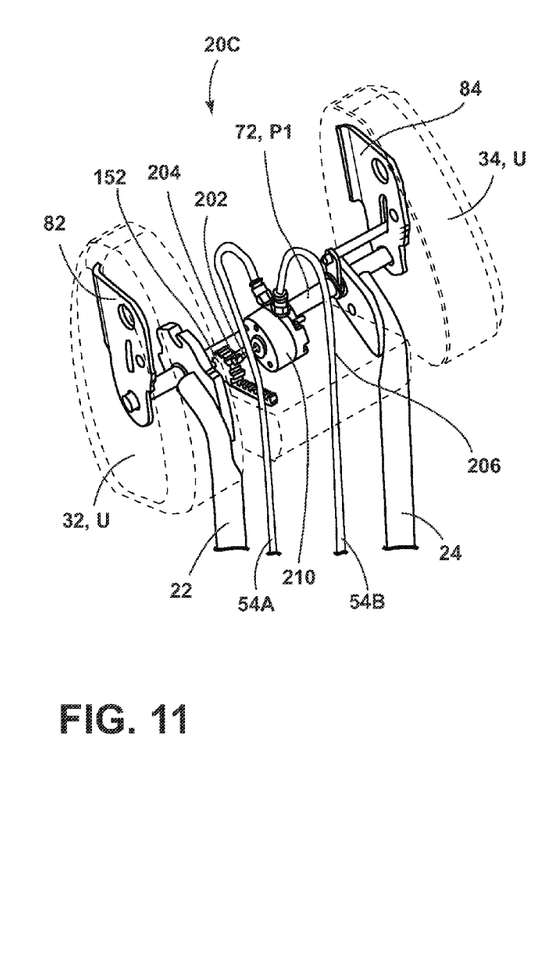
FIG. 11 is a rear perspective view of another embodiment of the drive system, wherein the drive system includes a pneumatic actuator.

Referring now to FIG. 11, another embodiment of a headrest assembly 20C is shown having a pneumatic actuator 210 with a drive shaft 202 and a gear 204 that is operably coupled to the second gear 152 of the gear assembly 149 described above. It is further contemplated that the drive shaft 202 can be a toothed drive shaft that is directly engaged in a driven relationship with gear 152. The pneumatic actuator 210 can be coupled to the inflation system 50 described above with reference to FIGS. 3 and 4. Supply lines 54A, 54B are shown in FIG. 11 as providing power for the pneumatic actuator 210 for adjusting the adjustable components of the headrest assembly 20C.

Figure 12A:
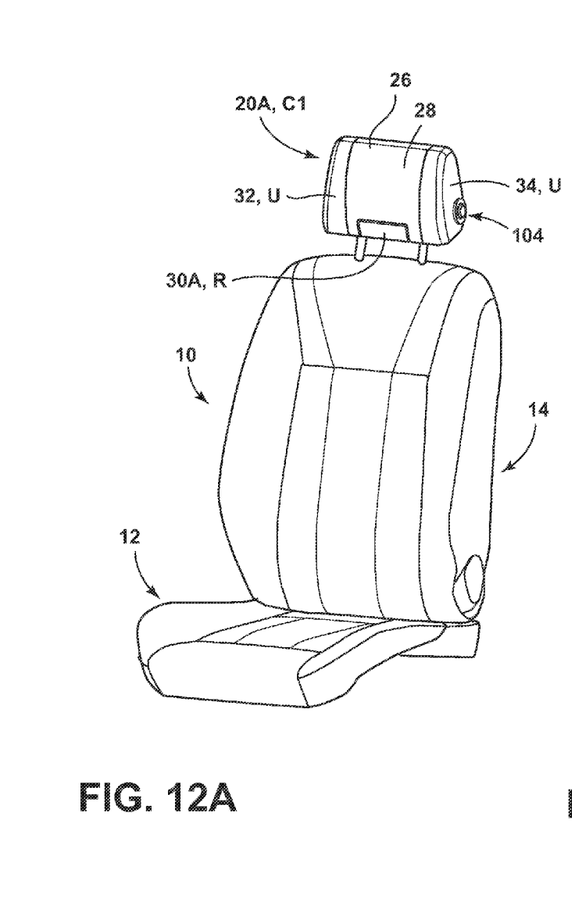
FIG. 12A is a front perspective view of a vehicle seat having a headrest assembly according to an embodiment of the present invention shown in a first configuration.
Figure 12B:
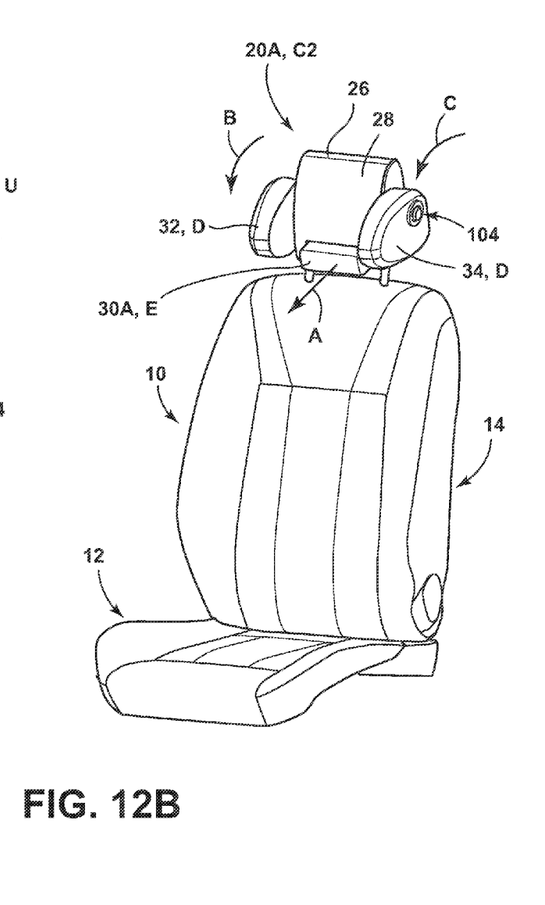
FIG. 12B is a front perspective view of the vehicle seat and headrest assembly of FIG. 12A showing the headrest assembly in a second configuration.

Referring now to FIGS. 12A and 12B, the vehicle seat 10 is shown with the embodiment of the headrest assembly 20A disposed thereon. With specific reference to FIG. 12A, the headrest assembly 20A is shown in a first configuration C1 wherein the first and second support arms 32, 34 are in the upright position C, and the lower portion 30A of the headrest bun 26 is in the retracted position R. The release button 104 is shown disposed on the second side support 34 in FIGS. 12A, 12B. With specific reference to FIG. 12B, it is contemplated that the release button 10 has been pushed inward to release the first and second side supports 32, 34 for downward rotation along the paths as indicated by arrows B and C to the deployed position D. Further, the lower portion 30A of the headrest bun 26 has moved to the extended position E along the path as indicated by arrow A. By the drive system 70 and gear assembly 149 described above, it is contemplated that the movement of the first and second side supports 32, 34 and the lower portion 30A of headrest bun 26 to the second configuration C2 shown in FIG. 12B is carried out in a synchronized manner by a user pressing the release button 104. To move the adjustable components back to the first configuration C1, a user will rotate either of the first or second side supports 32, 34 from the deployed position D to the upright position U. Further, it is contemplated that with the interconnection of all of the adjustable components, a user may also push the lower portion 30A of the headrest bun 26 in a lateral direction from the extended position E to the retracted position R to move and lock the adjustable components of the headrest assembly 20A in the first configuration C1 as shown in FIG. 12A.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle seat, comprising:
a seatback coupled to a seat cushion;
a headrest assembly supported from the seatback and operable between neutral and surround configurations, wherein the headrest assembly includes: a headrest bun having a lower portion configured to move between extended and retracted positions;
one or more side supports adjustably coupled to the headrest bun and operable between upright and deployed positions;
a drive system comprising:
a shaft rotatable coupled to the first and second support struts between first and second positions; and
first and second support arms disposed on the shaft and operably coupled to the first and second side supports, wherein the first and second support arms are configured to rotate with the shaft as the first and second support arms move between the upright and deployed positions.

2. The vehicle seat of claim 1, wherein the one or more side supports includes first and second side supports pivotally coupled to the headrest bun.

3. The vehicle seat of claim 2, wherein the first and second side supports are configured to pivot between the upright and deployed positions, and further wherein the first and second side supports extend outwardly in a forward direction from the headrest bun in the deployed position.

4. The vehicle seat of claim 3, wherein the first and second side supports include inner support surfaces that are exposed when the first and second side supports are in the deployed positions.

5. The vehicle seat of claim 4, wherein the inner support surfaces of the first and second side supports that are disposed on opposite sides of a head receiving area when the first and second side supports are in the deployed positions.

6. The vehicle seat of claim 5, wherein the lower portion of the headrest bun extends forward into the head receiving area when the lower portion of the headrest bun is in the extended position.

7. The vehicle seat of claim 1, wherein the headrest bun is a centrally disposed headrest bun having a stationary upper portion disposed above the lower portion.

8. The vehicle seat of claim 1, wherein the headrest assembly is supported on the seatback by first and second support struts that are vertically adjustable.

9. The vehicle seat of claim 1, including:
a gear assembly comprising:
a first gear disposed on the shaft; and
a second gear engaged with the first gear, wherein the second gear is operably coupled to a rack disposed on the lower portion of the headrest bun, such that the lower portion of the headrest bun moves between the retracted and extended positions as the shaft rotates from the first position to the second position.

10. The vehicle seat of claim 9, including:
a lock mechanism operably coupled to the shaft and configured to lock and retain the shaft in the first position;
a release mechanism operably coupled to the lock mechanism and configured to release the shaft for rotation from the first position to the second position, wherein the release mechanism includes a release button disposed on one of the first and second support arms; and
a biasing mechanism operably coupled to the shaft, wherein the biasing mechanism biases the shaft towards the second position.

11. A headrest assembly, comprising:
a central headrest bun having an upper portion and an adjustable lower portion, wherein the adjustable lower portion is configured to move between extended and retracted positions relative to the upper portion;
first and second side supports operably coupled to the headrest bun on opposite sides thereof between upright and deployed positions;
a drive system having a shaft rotatable between first and second positions, the shaft having first and second ends disposed on opposite sides of a central portion, wherein the central portion is substantially disposed within an interior space of the headrest bun;
first and second support arms disposed on the first and second ends of the shaft and operably coupled to the first and second side supports, wherein the first and second support arms are configured to rotate with the shaft, as the first and second support arms move between the upright and deployed positions; and
a gear assembly having a first gear disposed on the shaft, and a second gear engaged with the first gear, wherein the second gear is operably coupled to a rack disposed on the adjustable lower portion of the headrest bun, such that the adjustable lower portion of the headrest bun moves between the retracted and extended positions as the shaft rotates.

12. The headrest assembly of claim 11, wherein the shaft is biased towards the second position, and further wherein the adjustable portion of the headrest bun moves to the extended position and the first and second side supports move to the deployed position as the shaft rotates from the first position to the second position.

13. The headrest assembly of claim 12, including:
a lock mechanism operably coupled to the shaft and configured to lock and retain the shaft in the first position.

14. The headrest assembly of claim 13, including:
a release mechanism operably coupled to the lock mechanism and configured to release the shaft for rotation from the first position to the second position.

15. The headrest assembly of claim 11, wherein the first and second side supports include inner surfaces that are disposed on opposite sides of a head receiving area when the first and second side supports are in the deployed positions.

16. The headrest assembly of claim 11, wherein headrest assembly provides a neutral configuration when the adjustable lower portion is in the retracted position and the first and second side supports are in the upright positions.

17. The vehicle seat of claim 16, wherein the adjustable lower portion of the headrest bun extends forward into the head receiving area when the adjustable lower portion of the headrest bun is in the extended position.

* * * * *